US012705700B2

(12) United States Patent
(10) Patent No.: US 12,705,700 B2
(45) Date of Patent: Aug. 11, 2026

Qiu et al.

(54) IMAGE PROCESSING METHOD, APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Dayu Qiu, Beijing (CN); Ruchong Luo, Beijing (CN); Yubin Yu, Beijing (CN); Huilin Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 138 days.

(21) Appl. No.: 18/715,726

(22) PCT Filed: Nov. 28, 2022

(86) PCT No.: PCT/CN2022/134654
§ 371 (c)(1),
(2) Date: Jun. 2, 2024

(87) PCT Pub. No.: WO2023/098617
PCT Pub. Date: Jun. 8, 2023

(65) Prior Publication Data

US 2025/0045874 A1 Feb. 6, 2025

(30) Foreign Application Priority Data

Dec. 3, 2021 (CN) ......................... 202111467967.7

(51) Int. Cl.
*G06T 5/50* (2006.01)
*G06V 40/10* (2022.01)

(52) U.S. Cl.
CPC ................ *G06T 5/50* (2013.01); *G06V 40/10* (2022.01); *G06T 2207/20044* (2013.01); *G06T 2207/20221* (2013.01)

(58) Field of Classification Search
None
See application file for complete search history.

(56) References Cited

U.S. PATENT DOCUMENTS

2021/0049395 A1* 2/2021 Peng .................... G06V 40/103
2022/0130095 A1* 4/2022 Fan ......................... G06T 13/80

FOREIGN PATENT DOCUMENTS

CN 109583391 A 4/2019
CN 110147742 A 8/2019
(Continued)

OTHER PUBLICATIONS

International Patent Application No. PCT/CN2022/134654; Int'l Written Opinion and Search Report; dated Feb. 21, 2023; 8 pages.

*Primary Examiner* — Robert J Craddock
(74) *Attorney, Agent, or Firm* — BakerHostetler

(57) ABSTRACT

The present disclosure discloses an image processing method, an apparatus, an electronic device, and a storage medium. The method includes: determining at least one target limb key point of a current video frame; determining at least one current effect key point according to the at least one target limb key point and historical limb key points of at least one historical video frame adjacent to the current video frame; obtaining historical effect key points of the at least one historical video frame according to preset effect parameters, and determining, according to the at least one current effect key point and the historical effect key points, at least one group of target effects matching the preset effect
(Continued)

parameters; and determining a target video frame corresponding to the current video frame based on the at least one group of target effects.

20 Claims, 5 Drawing Sheets

(56) References Cited

FOREIGN PATENT DOCUMENTS

| | | | |
|---|---|---|---|
| CN | 111753784 | A | 10/2020 |
| CN | 111954055 | A | 11/2020 |
| CN | 113096225 | A | 7/2021 |
| CN | 113496506 | A | 10/2021 |
| CN | 114170632 | A | 3/2022 |
| WO | WO 2021/027547 | A1 | 2/2021 |
| WO | WO 2021/027631 | A1 | 2/2021 |
| WO | WO 2021/121291 | A1 | 6/2021 |

* cited by examiner

Determining at least one target limb key point of a current video frame — S110

Determining at least one current effect key point according to the at least one target limb key point and historical limb key points of at least one historical video frame adjacent to the current video frame — S120

Obtaining historical effect key points of at least one historical video frame according to preset effect parameters, and determining, according to the at least one current effect key point and the historical effect key points, at least one group of target effects matching the preset effect parameters — S130

Determining a target video frame corresponding to the current video frame based on the at least one group of target effects — S140

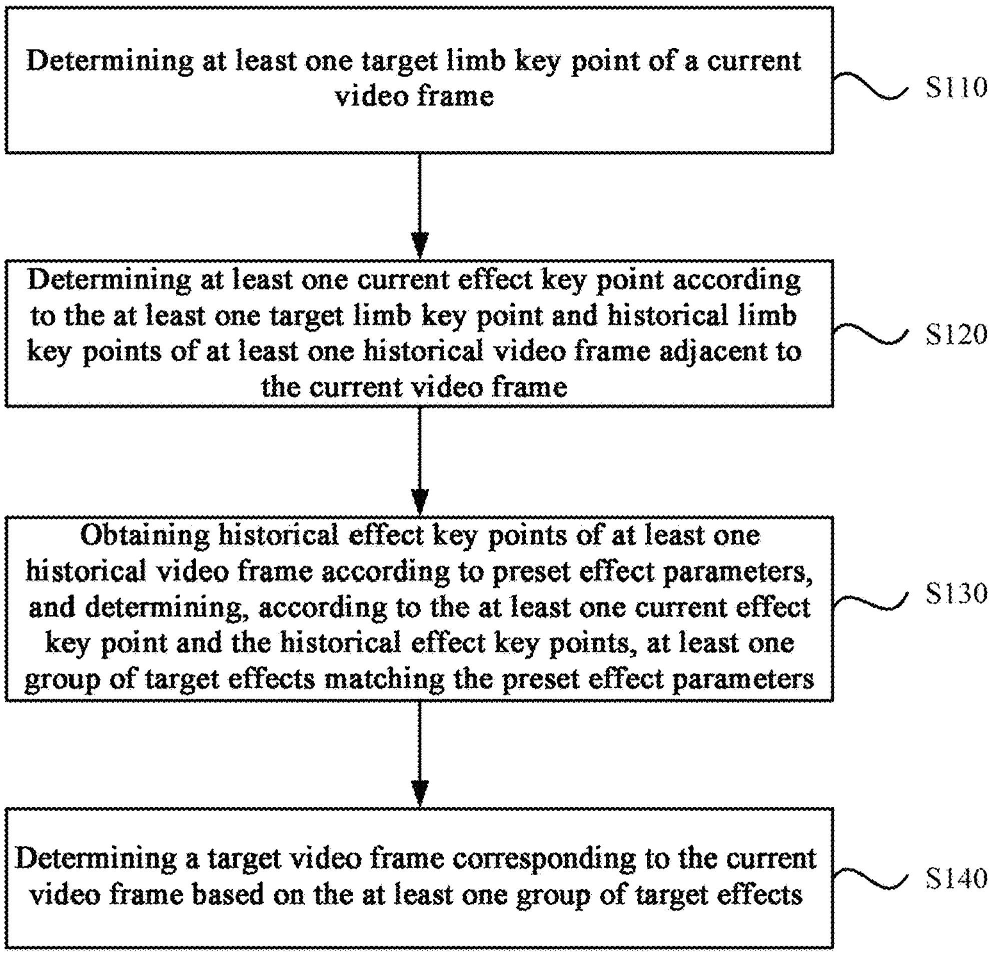

Fig. 1

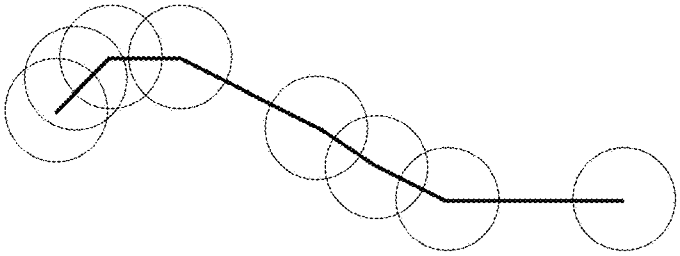

Fig. 2

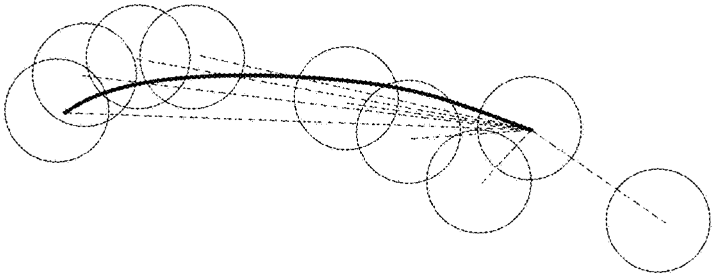

Fig. 3

IMAGE PROCESSING METHOD, APPARATUS, ELECTRONIC DEVICE, AND STORAGE MEDIUM

The present disclosure is a national stage application filed under 35 U.S.C. 371 based on International Patent Application No. PCT/CN2022/134654, filed Nov. 28, 2022, which claims the priority from the CN patent application Ser. No. 20/211,1467967.7 filed with the China National Intellectual Property Administration on Dec. 3, 2021, the contents of which are hereby incorporated by reference in their entireties.

FIELD

Embodiments of the present disclosure relate to the field of image processing technologies, and for example, to an image processing method, an apparatus, an electronic device, and a storage medium.

BACKGROUND

With the boom of short videos, more and more users shoot corresponding video information using terminal devices. In order to improve entertainment of video contents, users often add effects to the videos.

In a specific scenario, the added effects can be positioned through corresponding limb key points. The methods of determining limb key points according to the related technologies mainly include a 2D limb key point recognition method and a 3D limb key point recognition method, and principles of the methods lie in adding effects to a plurality of limb key points according to positions of the limb key points in multiple video frames. However, the effects determined based on multiple limb key points are not vivid enough, affecting the user experience.

SUMMARY

Embodiments of the present disclosure provide an image processing method and apparatus, an electronic device, and a storage medium, which can add smoother effects based on a subject's movement trajectory, to improve the user experience.

In a first aspect, embodiments of the present disclosure provide an image processing method, including:

determining at least one target limb key point of a current video frame;

determining at least one current effect key point according to the at least one target limb key point and historical limb key points of at least one historical video frame adjacent to the current video frame;

obtaining historical effect key points of the at least one historical video frame according to preset effect parameters, and determining, according to the at least one current effect key point and the historical effect key points, at least one group of target effects matching the preset effect parameters; and determining a target video frame corresponding to the current video frame based on the at least one group of target effects.

In a second aspect, embodiments of the present disclosure provide an image processing apparatus, including:

a target limb key point determining module configured to determine at least one target limb key point of a current video frame;

a current effect key point determining module configured to determine at least one current effect key point according to the at least one target limb key point and historical limb key points of at least one historical video frame adjacent to the current video frame;

a target effect group determining module configured to obtain historical effect key points of the at least one historical video frame according to preset effect parameters, and determine, according to the at least one current effect key point and the historical effect key points, at least one group of target effects matching the preset effect parameters; and a target video frame determining module configured to determine a target video frame corresponding to the current video frame based on the at least one group of target effects.

In a third aspect, embodiments of the present disclosure provide an electronic device, including:

one or more processors;

a storage configured to store one or more computer programs;

wherein the one or more computer programs, when executed by the one or more processors, cause the one or more processors to implement the image processing method of any of the embodiments of the present disclosure.

In a fourth aspect, embodiments of the present disclosure provide a storage medium having computer executable instructions which implement the image processing method of any of the embodiments when executed by a computer processor.

BRIEF DESCRIPTION OF THE DRAWINGS

Throughout the drawings, the same or similar reference symbols represent the same or similar elements. It would be appreciated that the drawings are provided illustratively, and the components and elements are not necessarily drawn to scale.

FIG. 1 illustrates a flowchart of an image processing method according to an embodiment of the present disclosure;

FIG. 2 illustrates a schematic diagram of a connection line between a target limb key point and historical limb key points before processing according to an embodiment of the present disclosure;

FIG. 3 illustrates a schematic diagram of a connection line between a target limb key point and historical limb key points after processing according to an embodiment of the present disclosure;

DETAILED DESCRIPTION OF EMBODIMENTS

Figure 4:
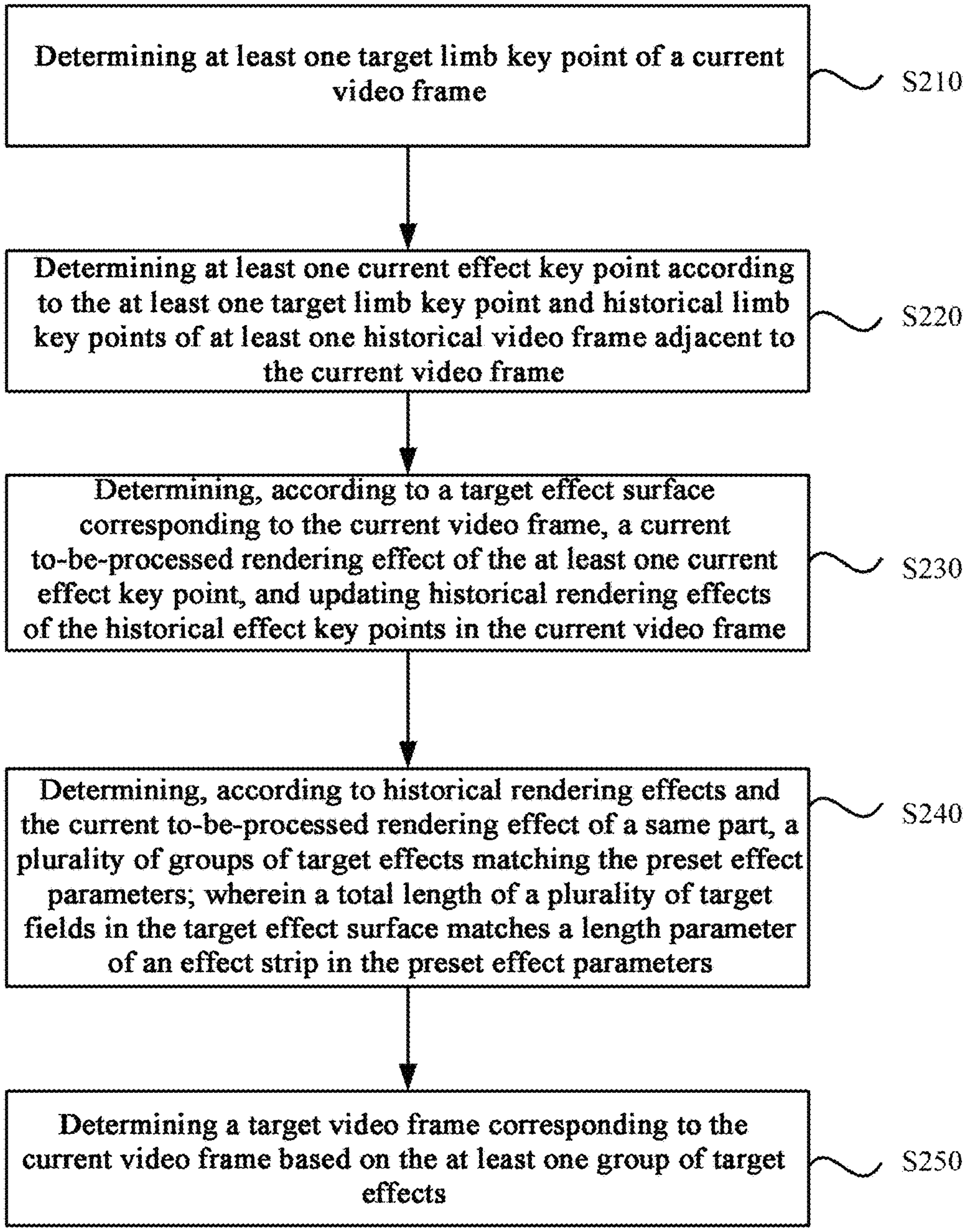
FIG. 4 illustrates a flowchart of an image processing method according to a further embodiment of the present disclosure.

It would be appreciated that a plurality of steps in the implementations of the method according to the present disclosure may be performed in different orders and/or performed in parallel. In addition, the method implementations may include additional steps and/or steps omitted. The scope of the present disclosure is not limited thereto.

As used herein, the term "includes" and its variants are to be read as open-ended terms that mean "includes, but is not limited to." The term "based on" is to be read as "based at least in part on." The term "an embodiment" is to be read as "at least one embodiment;" the term "another embodiment" is to be read as "at least one further embodiment;" the term "some embodiments" is to be read as "at least some embodiments." Related definitions of other terms will be provided in the description below.

It should be noted that, the terms "first," "second" and the like mentioned in the present disclosure are only used to distinguish different apparatuses, modules or units, rather than limit an order of functions performed by the apparatus, module or unit or limit interdependence.

It should be noted that, the terms "one" and "a plurality of" mentioned in the present disclosure are illustrative, not restrictive, and should be understood as "one or more" by those skilled in the art, unless explicitly specified otherwise in the context.

Names of messages or information interacted between a plurality of apparatuses in the embodiments of the present disclosure are illustrative rather than limit the scope of the message or information.

With the boom of short videos, in order to make the short videos more fancy, effect can be added to the videos. Embodiments of the present disclosure can be applied to images that need to be presented with effects. By way of example, the application scenario may be a short video of dancing, to which effects following limb movements of the subject can be added. It would be appreciated that, since the subject's movement is continuous in the video, the effect processing is performed following lines of movements of limbs when effects are to be added based on the limbs of the subject. Considering that the lines of the effects added to videos according to the related technologies are relatively stiff, not vivid enough, affecting the user experience, the technical solution according to embodiments of the present disclosure can be employed to implement effect processing on a plurality of video frames in a video, to achieve smoother effects.

FIG. 1 illustrates a flowchart of an image processing method according to an embodiment of the present disclosure. This embodiment can be applied to add effects to videos, to achieve smoother effects. The method can be performed by an image processing apparatus that can be implemented in the form of software and/or hardware, where the hardware may be an electronic device such as a mobile terminal, a PC, a server, or the like.

As shown therein, the method according to the embodiment of the present disclosure includes:

S110: determining at least one target limb key point of a current video frame.

It would be appreciated that the technical solution can be implemented by a server, a client, or a combination of a client and a server. For example, based on a video frame captured by a client and through video frame processing performed by the client, a corresponding effect is added to the video frame; or the captured video frame is uploaded to the server, and the server processes the video frame and then sent it to the client, to enable the client to present the video frame with the added effect.

Wherein, when adding an effect to a video, effect processing can be performed on a video uploaded by a user to the server. For example, the user may shoot a video through application software and then sends the video to the server. The present technical solution can be applied to enable the server to add a corresponding effect to each video frame in the video; or, the technical solution can be applied to a video shooting process (i.e., the video is live), where the shot video frame can be uploaded to the server, and the server can carry out the present technical solution to implement the effect processing. The current video frame can be read as a video frame undergoing or to undergo the effect processing. The video frame may, or may not, include a target subject which may be a person or an object, and the specific contents thereof match preset parameters.

By way of example, if a dancing video is processed, a dancing user is the target subject. The target subject in the video frame can be identified using an image recognition method. If there is no target subject, no effect is added to the video; and if there is a target subject, the corresponding recognition method is used to identify limb key points of the target subject, to obtain at least one target limb key point. The target limb key point can be read as a key point of the target subject determined based on the limb key points using the recognition method. In this embodiment, the limb key points may be a plurality of joint points of the user, which may be center points of the user's parts such as the head, neck, shoulders, elbows, hands, hips, legs, feet, and the like. The target limb key point can be read as specified limb key points of the user in the video image. For example, if an effect is added to the limb key point corresponding to the user's wrist and can move with the movement of the wrist, the limb key point corresponding to the user's wrist is the target limb key point. It would be appreciated that the number of the target limb key points may be one or plural. For example, if the limb key points of the two wrists are the target limb key points, the number of target limb key points is two when detecting, using a limb key point recognition algorithm, that there are two limb key points of the writs in the video frame; if a limb key point of a wrist in the video frame is occluded so that the limb key point cannot be detected through the limb key point algorithm, the number of the target limb key point is one at the time.

For example, a dancing video is taken as the example of the target video, and a video frame therein is to undergo effect processing. Whether a target subject exists in the video frame is first detected with the image recognition method. If there is no target subject, no effect processing is performed on the video. If there is a target subject, limb key points of the target subject are determined using the limb key point recognition algorithm, and the identified limb key points in the current video frame are used as the target limb key points.

It is worth noting that, through target limb key point recognition in the video frame, an effect can be added to an identified target limb key point in each video frame such that the effect corresponding to the target limb key point can generate an linkage effect when the video is being played.

For example, determining the at least one target limb key point of the current video frame includes: determining the at least one target limb key point in the current video frame using a limb key point recognition algorithm; or processing the current video frame using a pre-trained limb key point recognition model, to obtain the at least one target limb key point corresponding to the current video frame.

Wherein, identifying limb key points can be implemented in two manners of: a limb key point recognition algorithm which may include a 2D limb key point recognition algorithm or a 3D limb key point recognition algorithm, where a target subject in a video frame can be identified based on the algorithm such that a plurality of limb key points of the target subject can be determined; and a neural network model algorithm, where a limb key point recognition model is pre-built and then used to identify limb key points of a target subject in a video frame. In either of the manners as described above, a target subject in a video frame can be identified.

It should be noted that the obtained limb key points can be represented by coordinates of pixel points in the video frame. For example, effects can be added to a plurality of limb key points according to coordinate-point positions of the plurality of limb key points in the video frame to which they belong.

For example, the principle of identifying a target limb key point mainly includes performing identification through some feature points in an image. A prior knowledge base of limb key points is pre-built, which includes features of a plurality of limb key points, for example, shape, color, texture, line, and the like. A video frame is input and then scanned to determine whether the video frame includes corresponding feature points in the prior knowledge base. It can be determined that the video frame includes limb key points if they match the feature points in the prior knowledge base. Further, at least one target limb key point in the current video frame is determined.

Alternatively, a limb key point recognition training model is pre-built, and corresponding parameters are set. A plurality of human body images and limb key point images are input into the model; labeling processing is simultaneously performed on images containing limb key points, to determine, based on labels, whether images include limb key points; and the set training model is then used as the limb key point recognition model. Subsequently, a newly input image is identified based on the recognition model. By way of example, when a video is being processed, limb key points in a video frame are identified based on the pre-trained neural network model, to determine whether the video frame include limb key points, and then, based on a preset key point recognition rule, key point(s) meeting the key point recognition rule is determined as at least one target limb key point.

S120: determining at least one current effect key point according to the at least one target limb key point and historical limb key points of at least one historical video frame adjacent to the current video frame.

Wherein, the historical video frame can be read as a video frame preceding the current video frame, which is with reference to the current video frame. To-be-detected Limb key points can be set in advance. A historical limb key point can be read as coordinates of a key point corresponding to a preset limb key point in a historical video frame.

It would be appreciated that, when a wrist is a preset limb key point, the historical limb key point can be read as corresponding coordinates of the wrist of the target subject in each historical video frame. The current effect key point can be read as a key point having the same or a different position relative to the limb key point and determined based on a plurality of historical video frames, in a case of adding an effect to the limb key point, i.e., the current effect key point can be read as a key point for adding an effect to the limb key point. It is worth noting that the number of current effect key points may be one or plural, where the specific number can match the number of the preset limb key points. By way of example, a dancing video is taken as the example. If effects desired to be add can move along with limb key points corresponding to wrist and ankle areas of a target subject, the number of effect key points is 4, specifically: wrist 1, wrist 2, ankle 1 and ankle 2. When determining an effect corresponding to the wrist 1, a coordinate-point position of the wrist 1 where the effect is to be added can be determined based on the coordinate-point position of the limb key point corresponding to the wrist 1 in the current video frame, and coordinate-point positions of the wrist 1 in a plurality of historical video frames, and such coordinate-point position is used as the current effect key point.

It is to be understood that, when obtaining historical limb key points, all limb key points in each historical video frame are obtained, or a part of limb key points in each historical video frame is obtained. Here, a limb key point of a wrist is taken as the example, where the limb key point part may be comprised of a plurality of pixel points. A coordinate-point positions of pixel points corresponding to the wrist in the current video frame can be determined based on coordinate-point positions of pixel points corresponding to the wrist in each historical video frame, and a coordinate-point position of the current effect key point can be further determined based on the coordinate-point positions of the pixel points corresponding to the wrist.

For example, determining the at least one current effect key point according to the at least one target limb key point and the historical limb key points of at least one historical video frame adjacent to the current video frame includes: determining a plurality of limb key points belonging to a same part as a group of limb key points, where the group of limb key points includes the target limb key point and/or the historical limb key points.

Wherein, the group of limb key points can be read as a group of limb key points comprised of the target limb key point and/or historical limb key points of the current video frame. It is to be noted that a plurality of limb key points in the group of limb key points corresponds to the same part. By way of example, if an ankle is used as the example of the limb key point, the group of limb key points includes angle key points in the current video frame, and/or ankle key points in historical video frames.

For example, when effect processing is performed on a video, the area to be added with an effect is a target limb key point area, where the number of target limb key points in the current video frame may be one or plural. Therefore, the number of the current effect key points can be determined based on the number of target limb key points. The current video includes 2 target limb key points, specifically limb key points corresponding to two wrists, and since the target limb key point and/or historical limb key points corresponding to each wrist can form a set of limit key points, the current video includes two sets of limb key points.

For example, for each group of limb key points, a to-be-processed key point is determined according to weight values and corresponding key point coordinates of historical limb key points in the current set of limb key points; and the current effect key point corresponding to the group of limb key points is determined based on the to-be-processed key point corresponding to the set of key points and a corresponding target key point.

In the related technologies, when adding an effect to each limb key point, it is typically to add an effect to a target limb key point in a current video frame, and then add effect points in a plurality of historical video frames to the current video frame. That is, by connecting the effect key points in a plurality of video frames, a polyline can be generated, and the corresponding effect is displayed based on the polyline (see FIG. 2 for the result). The generated effect line is stiff, and the added effect line is stiff correspondingly, leading to poor user experience. In view of this, the present technical solution can be used for performing effect processing on limb key points, to achieve a smoother effect line effect.

As shown in FIG. 3, the dashed lines are original polyline traces for adding effect to the limb key points according to the related technologies, and the solid line is a connection line between to-be-processed key points after processing. It can be seen that the line determined according to the present technical solution has a gentle transition and is relatively smooth. Correspondingly, the effect presented ultimately is relatively smooth, and the specific implementation of achieving the effect will be described below in detail.

Wherein, the number of sets of limb key points may be plural, and each set is subject to the same processing. Introduction will be made with one set as the example, where the set to be introduced is a set of current subject key points. Coordinates of a key point can be read as a coordinate position of each limb coordinate point in each video frame image; the to-be-processed key point can be read as a key point obtained after performing smooth processing on the historical limb key point of each historical video frame; the target key port can be read as a target limb key point in the current video frame after smooth processing; and the current effect key point can be read as a key point for adding an effect to the current video frame.

For example, according to the present disclosure, when determining the current effect key point and determining an effect line based on a plurality of historical effect key points and the current effect key point, considering that the current effect key point is affected by historical effect points in the plurality of historical video frames, weight values corresponding to the plurality of historical video frames can be set in advance; effect processing are then performed on the video frame based on the current video frame and the plurality of historical video frames, to obtain the effect key points in the plurality of historical video frames; a smooth effect line can be obtained by connecting the plurality of effect key points; and further, an effect with smooth transitions can be obtained based on the effect line (see the solid line in FIG. 3).

On the basis, in order to obtain a smoother effect, the following may be included: determining a weight value of each historical video frame based on a generation time of each historical video frame, where the weight value is inversely proportional to the generation time; and obtaining an intermediate value by computing a product of key point coordinates of historical limb key points of each historical video frame and the corresponding weight value, and obtaining the to-be-processed key point by accumulating at least one intermediate value.

Wherein, the video may be comprised of a plurality of video frames arranged in a time order. When setting a weight value of each historical video frame, it can be determined based on a time interval between each historical video frame and the current video frame. The greater time interval indicates that the historical video frame is farther away from the current video frame, having less influence on the current video frame, and the corresponding video frame has a smaller weight value; otherwise, the historical frame has a larger weight value, i.e., the weight value of the video frame is inversely proportional to the generation time of the video frame. By way of example, if the weight value of the current video frame is set to 1, the weight value of the last video frame relative to the current video frame may be weight, where weight<1; the last video frame but one relative to the current video frame may be $weight^2$; the last video frame but two relative to the current video frame may be $weight^3$, and so on. In this way, the weight value of each historical video frame can be determined.

For example, when effect processing is performed in combination with a plurality of historical video frames, the number of the combined historical video frames is limited. It is typically set to 8. In the case, a circular array with a length of 8 can be set to store coordinate-point positions of the plurality of historical video frames. For example, when the $9^{th}$ video frame is the current video frame, the effect key points in the $9^{th}$ frame can be determined based on the coordinate points corresponding to the preceding 8 historical video frames in the array. Wherein, the weight value of the $8^{th}$ historical video frame may be weight; the weight value of the $7^{th}$ historical video frame is $weight^2$; the weight value of the $6^{th}$ historical video frame may be $weight^3$, and so on. In this way, the weight value of each historical video frame can be determined. An intermediate value can be obtained by computing a product of key point coordinates of historical limb key points of each historical video frame and the corresponding weight value, and the to-be-processed key point can be obtained by accumulating at least one intermediate value.

It is worth noting that, when the $10^{th}$ video frame is to be processed, it is required to update the array, the updated array is obtained by storing the coordinates of the historical effect points of the $2^{nd}$ through $9^{th}$ frames and removing the first datum stored in the array, and the current effect key point of the $10^{th}$ frame is determined based on the updated array. In other words, a preset number of historical video frames preceding a current video frame is stored in the array, and the generation times of the historical video frames each have a small time interval relative to the generation time of the current video frame. Therefore, the influence of a plurality of historical video frames on the effect points of the current video frame is taken into consideration, and an effect line with natural transitions can be obtained while a smoother effect can be achieved.

S130: obtaining historical effect key points of the at least one historical video frame according to preset effect parameters, and determining, according to the at least one current effect key point and the historical effect key points, at least one group of target effects matching the preset effect parameters.

Wherein, the preset effect parameters can be read as a length and a width of a preset effect area, and for the preset effect parameters, the length and the width of the effect area can be set according to a length of an effect area desired to be presented. The historical effect key point can be read as a key point added with an effect in each historical video frame; the target effect can be read as an effect presented in the current video, which may be an effect strip, or an effect pattern. Wherein, the number of the target effects corresponds to the number of the sets of the limb key points, and the target effects match the preset effect parameters. The at least one group of target effects can be read as one or more target effects added in a video frame, where the number thereof corresponds to the number of sets of limb key points.

For example, when an effect is added to a video, each video frame includes not only a current effect point in the current video frame but also a plurality of historical effect key points in a plurality of historical video frames, where the number of current effect points included in the video frame may be one or plural. Based on the length and the width of the preset effect strip, the historical effect key points of the plurality of historical effect video frames and the at least one current effect key point are displayed correspondingly in the effect area, and at least one group of target effects matching the preset effect parameters is determined.

For example, the preset effect parameters include an effect strip display length, and obtaining the historical effect key points of the at least one historical video frame according to the preset effect parameters includes: obtaining, according to the effect strip display length, the historical effect key points of at least one historical frame preceding the current video frame.

Wherein, the effect strip can be read as an effect specifically displayed. The preset effect display parameters include a displayed shape, length, width, and the like, of the effect stripe. The effect strip may be rectangular or triangular, or may be of any personalized shape, for example, a fish shape, a dragon shape, or the like.

For example, since the preset effect parameters include a length and a width of an effect strip, in order to make the effect more pleasing, a geometric shape or a pattern can be further included. For example, the pattern may be a triangular pattern, dragon pattern, butterfly pattern, rainbow pattern, or any other pattern where the length and the width of which can be set. It is to be understood that the length and the width of the effect strip match the preset effect parameters, and are determined based on the preset effect parameters. When displaying an effect in a video frame, the length of the effect is not infinite but matches the preset effect parameters. When displaying an effect, the historical effect key points in the plurality of historical video frames preceding the current video frame can be obtained based on the display length of the effect strip, and the historical effect key points are displayed within the length range of the effect strip.

For example, determining, according to the at least one current effect key point and the historical effect key points, the at least one group of target effects matching the preset effect parameters includes: obtaining a plurality of groups of target effects matching the preset effect parameters by processing historical effect key points and the current effect key point of the same part.

For example, the number of target effects in the video frame matches the number of the current effect key points. If two wrists and two foot areas of a person are considered as target limb key points and effects are to be added to the target limb key points, the target limb key points to be added with effects are the current effect key points. Considering that the target limb key points may be occluded during the movement of the target subject in the video frame, the number of the current effect key points may, or may not, be equal to the number of the target limb key points. In the case, the number of the current effect key points of the target effects in the video frame is at most 4, and each part may correspond to a group of target effects. For example, a plurality of groups of target effects matching the preset effect parameters can be obtained by processing historical effect key points and the current effect key point of the same part. By way of example, if the number of target limb key points forms a set, the length of the effect strip can be determined based on the preset effect parameters, and a group of target effects matching the preset effect parameters can be obtained by processing historical effect key points and the current effect key point of the same part.

S140: determining a target video frame corresponding to the current video frame based on the at least one group of target effects.

For example, after determining the at least one group of target effects, the at least one group of target effects is added to the corresponding position of the current video frame, and the video frame with the added effect is the target video frame.

For example, determining the target video frame corresponding to the current video frame based on the at least one group of target effects includes: adding the at least one group of target effects to corresponding target limb key points, to obtain the target video frame corresponding to the current video frame.

For example, on the basis of the above example, the at least one set of target effect includes a group of target effects corresponding to the wrist 1, a group of target effects corresponding to the wrist 2, a group of target effects corresponding to the foot 1, and a group of target effects corresponding to the foot 2. Then, the target effects can be added to corresponding target limb key points, to obtain a target video frame.

The technical solution according to the embodiment of the present disclosure includes: determining at least one target limb key point of the current video frame; obtaining, based on a target limb key point, historical limb key points in a plurality of historical video frames corresponding to the target limb key point; determining a group of limb key points corresponding to the target limb key point; and then, adding an effect to each group of limb key points. At least one current effect key point is determined based on the at least one target limb key point and historical limb key points of at least one historical video frame adjacent to the current video frame; a corresponding weight value is determined based on a generation time of each historical video frame; smooth processing is performed on the plurality of limb key points, to make the connection line between the plurality of key point smoother. The historical effect key points of the at least one historical video frame are obtained based on preset effect parameters; at least one group of target effects matching the preset effect parameters is determined based on the at least one current effect key point and the historical effect key points; a plurality of groups of target effects matching the preset effect parameters can be obtained based on the preset effect parameters and the historical limb key points. A target video frame corresponding to the current video frame is determined based on the at least one group of target effects, and a smoother video effect is presented to the user based on the target video frame. The present disclosure can avoid generation of a stiff effect line determined based on a movement trajectory of a target subject in a video, which causes an unsatisfactory effect and results in poor user experience, and can obtain a smooth effect line added based on the movement trajectory of the subject.

FIG. 4 is a flowchart of an image processing method according to a further embodiment of the present disclosure. On the basis of the embodiments described above, the effect processing can be optimized, to obtain a smoother effect, where description about the same or corresponding technical terms described in the above embodiments are omitted here for brevity.

As shown therein, the method includes:

S210: determining at least one target limb key point of a current video frame.

S220: determining at least one current effect key point according to the at least one target limb key point and historical limb key points of at least one historical video frame adjacent to the current video frame.

S230: determining, according to a target effect surface corresponding to the current video frame, a current to-be-processed rendering effect of the at least one current effect key point, and updating historical rendering effects of the historical effect key points in the current video frame.

Wherein, the target effect surface may be a preset surface, or may be an effect surface generated dynamically when determining a target effect of each video frame. The target effect surface may include effect parameters corresponding to the effect, for example, a color, a transparency, and the like, of the effect, and may include parameters of the target effect surface, for example, a length, a width, a shape, and the like. The current to-be-processed rendering effect can be read as effect information corresponding to the current effect point determined based on the target effect surface, where the effect information may include a color, a width, a transparency, and the like, of the effect. It would be appreciated that each historical video frame includes corresponding historical effect key points, where each historical effect key point may correspond to pixel points in the current video frame, and effect display information of the corresponding pixel points can be updated based on the target effect surface.

For example, related effect information of the effect can be filled into the preset target effect surface. In the target effect surface, the related effect information may be color information, transparency information, width information, and the like. Since the effect is continuous (i.e., a plurality of historical effect key points can be displayed correspondingly in the current video frame), considering the influence of the plurality of historical video frames on the current video frame, historical rendering effects of the historical effect key points in the current video frame can be updated correspondingly by performing rendering processing on the current effect key point.

For example, determining, according to the target effect surface corresponding to the current video frame, the current to-be-processed rendering effect of the at least one current effect key point, includes: creating a surface corresponding to the target effect; determining ordinate values corresponding to a plurality of abscissas in the to-be-processed surface, and determining, based on a plurality of ordinate values, a to-be-used surface; and determining rendering effects of a plurality of points in the to-be-used surface, to obtain the target effect surface.

Wherein, the to-be-processed surface is a pre-created surface, specifically a surface having a corresponding length and width and a certain arc. For the created to-be-processed surface, abscissa values are set, values of ordinates corresponding to the plurality of abscissas are set correspondingly, and a to-be-processed surface corresponding to the abscissa values is used as the to-be-used surface.

For example, a to-be-processed surface corresponding to the target effect can be created in advance, which has a corresponding length and width. The abscissas are in the length direction, a value of an ordinate corresponding to each abscissa is set correspondingly, and a to-be-used surface is thus obtained. For example, in order to make the video more visual, effect processing can be performed on a plurality of pixel points in the to-be-used surface, corresponding information, such as color and transparency values, and the like, is added to the plurality of pixel points in the to-be-used surface, and the target effect surface thus can be obtained.

Figure 5:
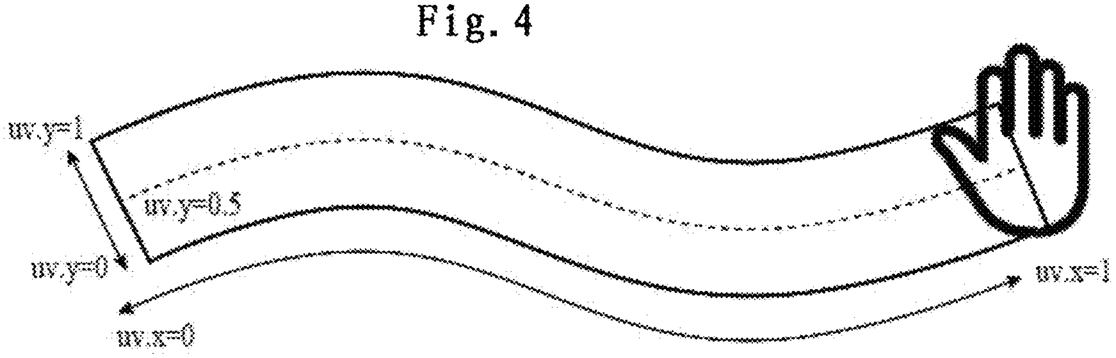
FIG. 5 illustrates a target effect surface according to an embodiment of the present disclosure.
Figure 6:
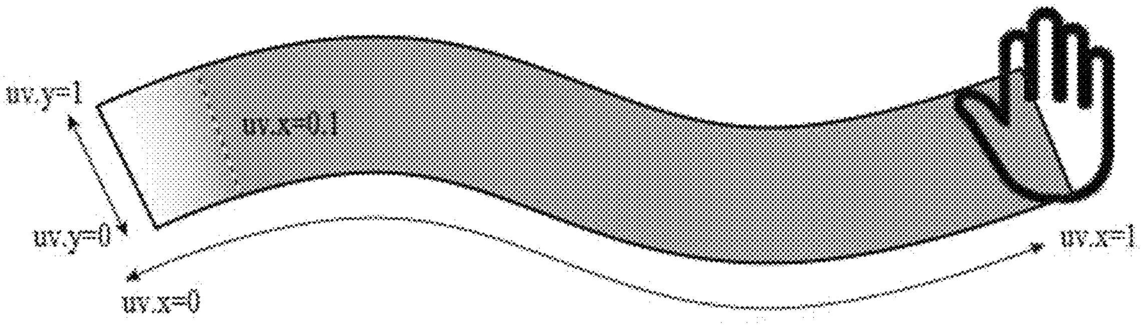
FIG. 6 illustrates a schematic diagram of a target effect surface with a tail end fading out according to an embodiment of the present disclosure.

By way of example, referring to FIG. 5, a coordinate system is established with the origin of the to-be-processed surface as the center, where the horizontal direction is the X axis, and the longitudinal direction is the Y axis. Based on the coordinate system, the ordinates corresponding to the abscissas (i.e., the width of the displayed to-be-processed surface) are determined. For example, a change step of the X axis is 0.1, i.e., every when X is increased by 0.1, Y is changed by 0.01. The changes in the X and Y axes can be set as required actually. If the change rate is smaller, the effect is smoother. See FIG. 6 for the changed effect diagram.

It is worth noting that the Y value is changed with the dotted line in FIG. 5 being the central axis of symmetry, to ensure the harmonious effect of the effect display.

Figure 7:
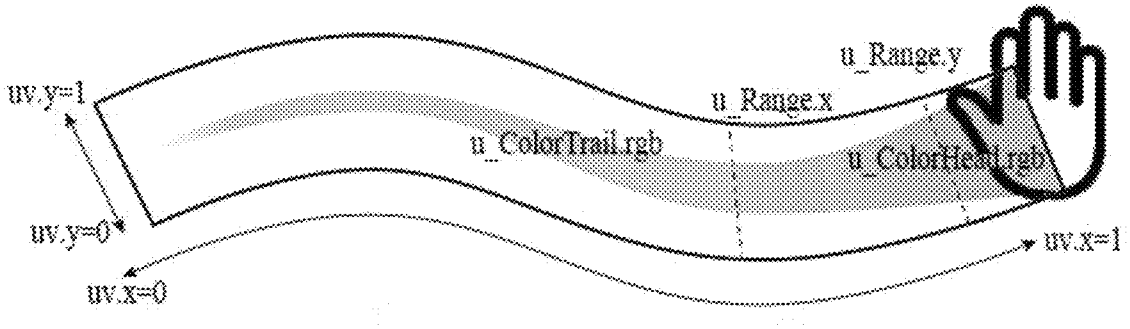
FIG. 7 illustrates a schematic diagram of a target effect surface after soft processing according to an embodiment of the present disclosure.

In addition, corresponding color and transparency are not shown in the effect diagram. The corresponding color and transparency for each point in the to-be-used surface can be set based on the X axis, to obtain a target effect surface with a better effect. See FIG. 7.

For example, determining, according to the target effect surface corresponding to the current video frame, the current to-be-processed rendering effect of the at least one current effect key point, and updating the historical rendering effects of the historical effect key points in the current video frame, comprise: determining abscissas corresponding to the target effect surface according to at least one historical video frame to which the historical effect key points belong, and generation time information of the current video frame; and determining, according to the abscissas, a current to-be-processed rendering effect of the current video frame, and updating historical rendering effects of historical effect key points corresponding to at least one historical video frame.

For example, the effect information displayed in the target effect surface includes not only effect information of the current effect key point, but also effect information of historical effect key points. A corresponding abscissa of each historical video frame in the target effect surface is determined based on generation time information of each historical video frame. If the historical video frame has an earlier generation time, the corresponding target effect surface has a smaller abscissa value. For example, a transparency, a color, a shape, or the like, of a historical effect key point at a corresponding position in the current video frame can be set, and the current to-be-processed rendering effect of the current video frame can be determined.

S240: determining a plurality of groups of target effects matching the preset effect parameters by processing historical effect key points and the at least one current effect key point of the same part.

Wherein, a total length of a plurality of target fields in the target effect surface matches a length parameter of an effect strip in the preset effect parameters.

Wherein, the plurality of target fields in the target effect surface can be read as fields of a plurality of historical video frames displayed in the current video frame, including historical rendering effects in the plurality of historical video frames and a number of the plurality of historical video frames, and a total length of the plurality of target fields matches the length parameter of the effect strip in the preset effect parameters.

For example, based on pixel points in the current video frame corresponding to historical effect key points in each historical video, and based on effect display information in the preset effect parameters, for example, a display length, width, transparency, and the like, the plurality of pixel points are displayed based on the corresponding effect information, to obtain a target effect corresponding to the current video frame.

S250: determining the target video frame corresponding to the current video frame based on the at least one group of target effects.

The technical solution according to the embodiment of the present disclosure includes: determining, according to a target effect surface corresponding to the current video frame, a current to-be-processed rendering effect of the at least one current effect key point, and updating historical rendering effects of the historical effect key points in the current video frame, to present the rendering effects of the current effect key point and the updated historical effect key points in the current video frame; then, determining, according to historical rendering effects and the current to-be-processed rendering effect of the same part, a plurality of groups of target effects matching the preset effect parameters; where a total length of a plurality of target fields in the target effect surface matches a length parameter of an effect strip in the preset effect parameters; adding an effect to each key point in the video frame; and a target video corresponding to the current video frame can be obtained based on the plurality of video frames added with effects. The present disclosure can avoid the situation that the effects are not smooth enough when being displayed, i.e., the effects generated according to the present disclosure are smoother.

Figure 8:
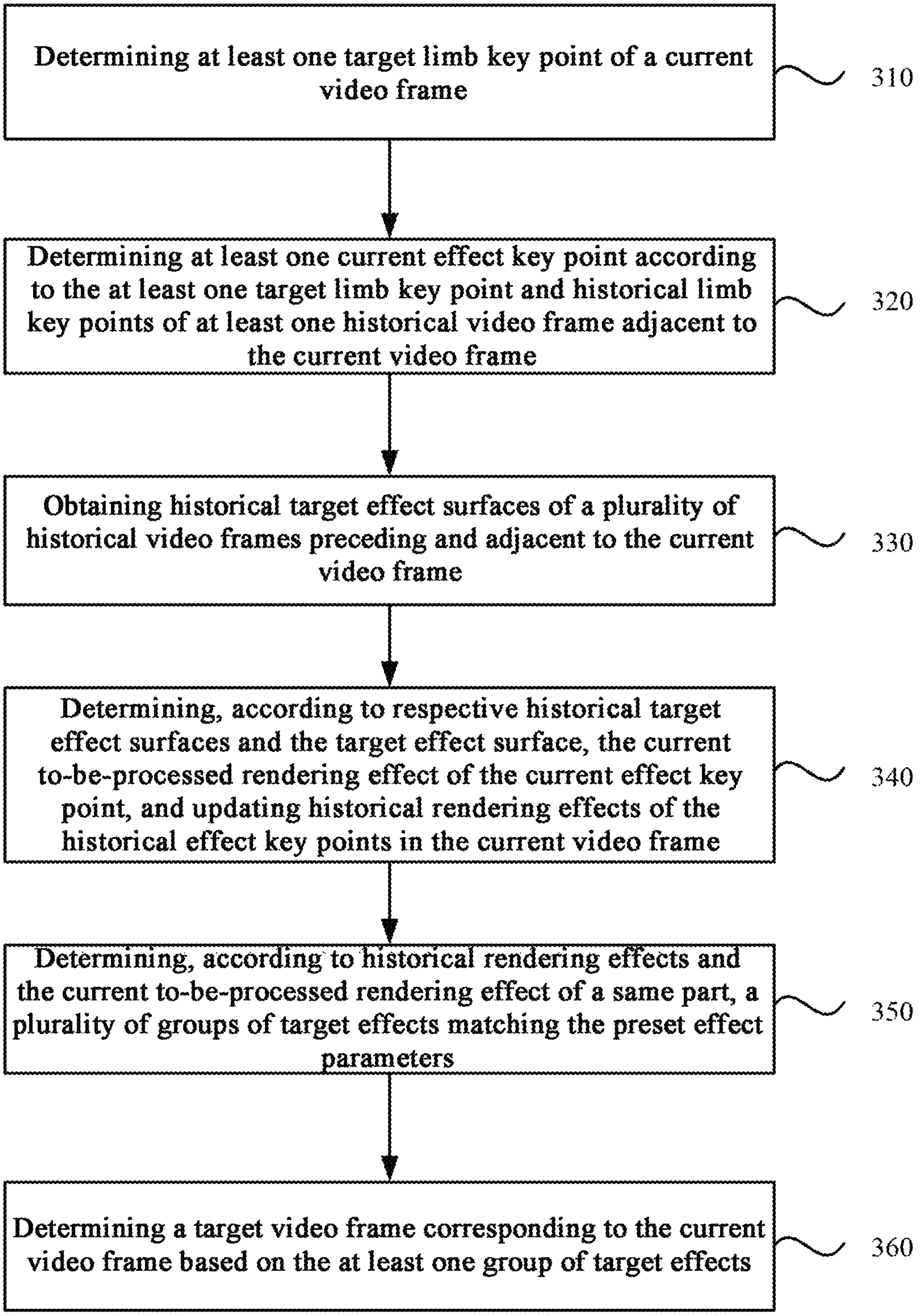
FIG. 8 illustrates a flowchart of an image processing method according to a further embodiment of the present disclosure.

FIG. 8 illustrates a flowchart of an image processing method provided by a further embodiment of the present disclosure. On the basis of the above two embodiments, the effect processing can be optimized, to obtain smoother effects, where description about the same or corresponding technical terms described in the above embodiments are omitted here for brevity.

As shown therein, the method includes:

S310: determining at least one target limb key point of a current video frame.

S320: determining at least one current effect key point according to the at least one target limb key point and historical limb key points of at least one historical video frame adjacent to the current video frame.

S330: obtaining historical target effect surfaces of a plurality of historical video frames preceding and adjacent to the current video frame.

For example, each video frame has a target effect surface corresponding thereto, where the target effect surface of each historical video frame is called historical target effect surface.

It would be appreciated that, in practice, if a rendering effect of effect key points of a frame is displayed on a screen, although the effect display is smooth, target effect surfaces of a plurality of historical video frames each having a small time interval from the current video frame can be processed before obtaining the current video frame, to improve the smooth effect.

S340: determining, based on the plurality of historical target effect surfaces and the target effect surface, the current to-be-processed rendering effect of the at least one current effect key point, and updating historical rendering effects of the historical effect key points in the current video frame.

For example, the display information of the historical effect key points in the current video frame can be determined by overlaying the target effect surface of the current video frame and the target effect surfaces corresponding to the plurality of historical video frames, and then, the historical rendering effects of the historical effect key points in the current video frame can be obtained.

For example, determining, based on the plurality of historical target effect surfaces and the target effect surface, the current to-be-processed rendering effect of the at least one current effect key point, and updating historical rendering effects of the historical effect key points in the current video frame, include: determining an effect overlay weight value corresponding to each historical target effect surface; obtaining, according to the effect overlay weight value and a corresponding target effect surface, to-be-overlaid rendering effects of a plurality of pixels of each group of historical target effects in at least one group of historical target effects; and determining, according to the to-be-overlaid rendering effects and the target effect surface of the current video frame, the current to-be-processed rendering effect of the at least one current effect key point, and updating historical rendering effects of the historical effect key points in the current video frame.

Wherein, during effect processing, the effects of the plurality of historical effect video frames have an influence on the effect of the current video frame, and therefore, the effects of the plurality of historical video frames can be overlaid when determining the effect of the current video frame. Typically, a historical video frame generated earlier relative to the current video frame has less influence on the current video frame. In the circumstance, the effect overlay weight value having the greatest time interval from the current video frame is set to a minimum value, and so on. In this way, the effect overlay weight value of each historical video frame can be determined. The to-be-overlaid rendering effect can be read as a rendering effect after overlaying a plurality of historical target effect surfaces.

It is to be noted that the number of historical video frames may be preset, for example, 5.

For example, the historical video frame having a greater time interval from the current video frame has less influence on the current video frame. In the circumstance, a weight value corresponding to each historical video frame is determined based on a time interval of each historical video frame from the current video frame, where the time interval is inversely proportional to the weight value, i.e., if the time interval is greater, the weight value is smaller. Each historical effect surface corresponds to a plurality of pixel points in a video frame. By setting corresponding effect overlay weight values for a plurality of pixel points corresponding to each historical effect surface, a pixel point corresponding to each pixel point in the current video frame, as well as effect display information of each pixel point, can be determined. On the basis, the to-be-processed rendering effect of the current effect key point can be updated, and the historical rendering effects of the historical effect key points in the current video frame can be updated.

For example, determining, according to the to-be-overlaid rendering effects and the target effect surface of the current video frame, the current to-be-processed rendering effect of the at least one current effect key point, and updating historical rendering effects of the historical effect key points in the current video frame, include: determining, according to the target effect surface of the current video frame, historical rendering effects of the historical effect key points in the current video frame, and determining the current to-be-processed rendering effect of the at least one current effect key point; and overlaying the to-be-overlaid rendering effects to corresponding pixel points in the current video frame, to update a plurality of the historical rendering effects and the current to-be-processed rendering effect.

For example, in order to achieve a better rendering effect, smearing processing may be performed on the effects, to make the effects vivid. Coordinate positions corresponding to the plurality of historical effect key points are recorded, and coordinate positions of the historical effect key points in the current video frame are determined. Then, the historical rendering effects of the historical effect key points are overlaid on the corresponding pixel points in the current video frame, and the plurality of historical rendering effects are combined with the to-be-processed current effect. Abscissas of the target effect surface are arranged according to a time order, and a value of an ordinate corresponding to each abscissa is set. According to the generation time of each historical video frame, the width value corresponding to the current video frame is the greatest. An effect width value corresponding to a historical video frame is smaller if the historical video frame is farther away from the current video frame. By performing overlaying processing on historical rendering effects of the plurality of historical video frame and the to-be-processed rendering effect of the current video frame, a smearing effect can be generated. With the play of the video frames, each video frame is processed likewise, and the plurality of historical rendering effects and the current to-be-processed rendering effect are updated.

For example, if the rendering effect values corresponding to the plurality of pixel points are less than a preset rendering effect threshold, all the rendering effect values of the pixel points are cleared to obtain a target video frame corresponding to the current video frame.

Wherein, the preset rendering effect threshold can be read as a value of a rendering effect set for a plurality of pixel values.

For example, when the rendering effect of the current video frame includes effect display information corresponding to the plurality of historical video frames, there may be the case where effect values of some pixel points are small since the effect is processed in conjunction with the target effect surfaces of the historical video frames. At this time, if the effect corresponding to the pixel points are still displayed, the picture is not clean. On the basis, it can be based on the effect values of corresponding pixel points, to determine whether they are to be cleared. The preset rendering effect threshold may be set to 0.01. When a rendering effect value corresponding to a pixel point is less than 0.01, it is indicated that the rendering effect corresponding to the pixel point should be cleared. If rendering effects of a plurality of historical video frame are reserved when the effect of the video is displayed, the rendering effect in the video will be messy, affecting the display of the rendering effect. Accordingly, a rendering effect threshold corresponding to each pixel point can be set, and the rendering effect of the pixel point having a value less than the threshold is cleared. As such, a clean video frame picture with the effect can be obtained.

S350: determining, according to historical rendering effects and the current to-be-processed rendering effect of a same part, a plurality of groups of target effects matching the preset effect parameters.

S360: determining the target video frame corresponding to the current video frame based on the at least one group of target effects.

The technical solution according to the embodiment of the present disclosure include: obtaining historical target effect surfaces of a plurality of historical video frames preceding and adjacent to the current video frame; and then determining the current to-be-processed rendering effect, based on corresponding positions of the current effect key point in the plurality of historical target effect surfaces. Based on the plurality of historical target effect surfaces and the target effect surface, the current to-be-processed rendering effect of the current effect key point is determined, and historical rendering effects of the historical effect key points in the current video frame are updated, to make clear a historical rendering effect having a great time interval from the current video frame; then, a plurality of groups of target effects is determined based on the plurality of historical rendering effects and the current to-be-processed rendering effect in the current video frame. The present disclosure can avoid an unsatisfactory effect generated as the historical rendering effects are retained on the display for a long time, and can reduce the impact of the historical video rendering effects, thereby smoothing the smearing effect of the effect.

Figure 9:
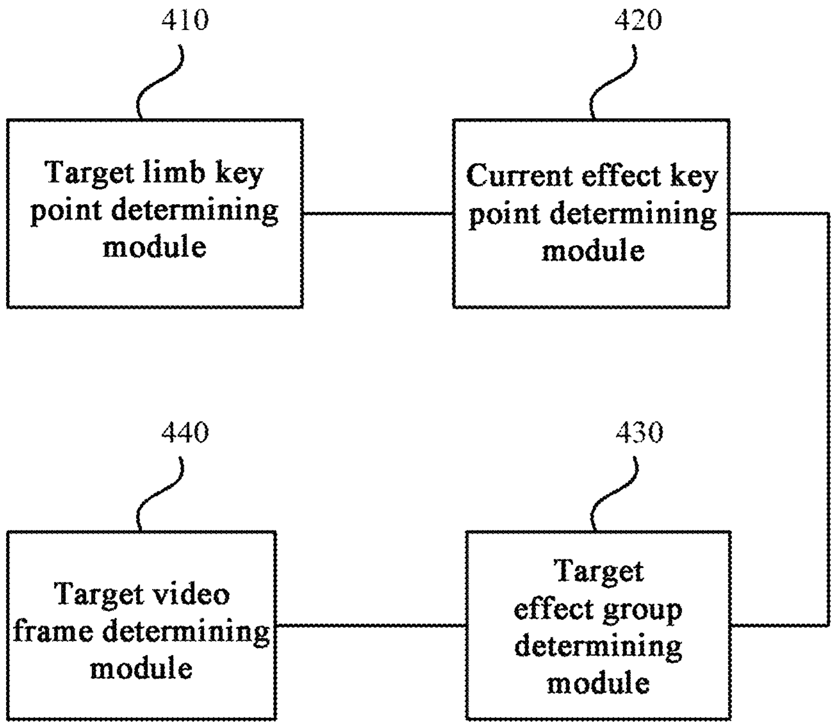
FIG. 9 illustrates a structural schematic diagram of an image processing apparatus according to an embodiment of the present disclosure.

FIG. 9 illustrates a structural schematic diagram of an image processing apparatus according to an embodiment of the present disclosure. The apparatus includes: a target limb key point determining module 410, a current effect key point determining module 420, a target effect group determining module 430, and a target video frame determining module 440.

The target limb key point determining module 410 is configured to determine at least one target limb key point of a current video frame.

The current effect key point determining module 420 is configured to determine at least one current effect key point according to the at least one target limb key point and historical limb key points of at least one historical video frame adjacent to the current video frame.

The target effect group determining module 430 is configured to obtain historical effect key points of the at least one historical video frame according to preset effect parameters, and determine, according to the at least one current effect key point and the historical effect key points, at least one group of target effects matching the preset effect parameters.

The target video frame determining module 440 is configured to determine the target video frame corresponding to the current video frame based on the at least one group of target effects.

The technical solution according to the embodiment of the present disclosure includes: determining at least one target limb key point of the current video frame; obtaining, based on a target limb key point, historical limb key points in a plurality of historical video frames corresponding to the target limb key point; determining a group of limb key points corresponding to the target limb key point; and then, adding an effect to each group of limb key points. At least one current effect key point is determined based on the at least one target limb key point and historical limb key points of at least one historical video frame adjacent to the current video frame; a corresponding weight value is determined based on a generation time of each historical video frame; smooth processing is performed on the plurality of limb key points, to make the connection line between the plurality of key point smoother. The historical effect key points of the at least one historical video frame are obtained based on preset effect parameters; at least one group of target effects matching the preset effect parameters is determined based on the at least one current effect key point and the historical effect key points; a plurality of groups of target effects matching the preset effect parameters can be obtained based on the preset effect parameters and the historical limb key points. A target video frame corresponding to the current video frame is determined based on the at least group of target effects, and a smoother video effect is presented to the user based on the target video frame. The present disclosure can avoid generation of a stiff effect line determined based on a movement trajectory of a target subject in a video, which causes an unsatisfactory effect and results in poor user experience, and can obtain a smooth effect line added based on the movement trace of the subject.

On the basis of the above technical solution, the target limb key point determining module is configured to:

determine the at least one target limb key point in the current video frame using a limb key point recognition algorithm; or process the current video frame using a pre-trained limb key point recognition model, to obtain the at least one target limb key point corresponding to the current video frame.

On the basis of the above technical solution, the current effect key point determining module includes:

a limb key point set determining sub-module configured to determine a plurality of limb key points belonging to a same part as a group of limb key points, wherein the group of limb key points comprises the target limb key point and the historical limb key points;

a to-be-processed key point determining sub-module configured to determine, for each group of limb key points in the plurality of groups of limb key points, a to-be-processed key point according to weight values and corresponding key point coordinates of historical limb key points in each group of limb key points; and a current effect key point determining sub-module configured to determine a current effect key point corresponding to said each group of limb key points according to the to-be-processed key point corresponding to said each set of key points and a corresponding target key point.

On the basis of the above technical solution, the to-be-processed key point determining sub-module includes:

a weight value determining unit is configured to determine a weight value of each historical video frame according to a generation time of said each historical video frame, wherein the weight value is inversely proportional to the generation time; and a to-be-processed key point determining unit configured to obtain an intermediate value by computing a product of key point coordinates of historical limb key points of said each historical video frame and the corresponding weight value, and obtaining the to-be-processed key point by accumulating at least one intermediate value.

On the basis of the above technical solution, the target effect group determining module is configured to:

obtain, based on the effect strip display length, the historical effect key points of at least one historical frame preceding the current video frame.

On the basis of the above technical solution, the target effect set determining module is configured to:

obtain a plurality of groups of target effects matching the preset effect parameters by processing historical effect key points and the current effect key point of a same part.

On the basis of the above technical solution, the target effect group determining module is configured to:

a rendering effect determining sub-module configured to determine, according to a target effect surface corresponding to the current video frame, a current to-be-processed rendering effect of the at least one current effect key point, and update historical rendering effects of the historical effect key points in the current video frame; and a target effect determining sub-module configured to determine, according to historical rendering effects and the current to-be-processed rendering effect of a same part, a plurality of groups of target effects matching the preset effect parameters; wherein a total length of a plurality of target fields in the target effect surface matches a length parameter of an effect strip in the preset effect parameters.

On the basis of the above technical solution, the rendering effect determining sub-module includes:

a to-be-processed surface creating unit configured to create a surface corresponding to the target effect;

a to-be-used surface determining unit configured to determine ordinate values corresponding to a plurality of abscissas in the to-be-processed surface, and determining, based on a plurality of ordinate values, a to-be-used surface; and a target effect surface determining unit configured to determine rendering effects of a plurality of points in the to-be-used surface, to obtain the target effect surface.

On the basis of the above technical solution, the rendering effect determining sub-module includes:

an abscissa determining unit configured to determine abscissas corresponding to the target effect surface based on a three-dimensional historical video frame to which each historical effect key point belongs, and generation time information of the current video frame; and a rendering effect determining unit configured to determine, according to the abscissas, a current to-be-processed rendering effect of the current video frame, and update historical rendering effects of historical effect key points corresponding to at least one historical video frame.

On the basis of the above technical solution, the rendering effect determining sub-module includes:

a historical target effect surface obtaining unit configured to obtain historical target effect surfaces of a plurality of historical video frames preceding and adjacent to the current video frame; and a current to-be-processed rendering effect determining unit configured to determine, based on the plurality of historical target effect surfaces and the target effect surface, the current to-be-processed rendering effect of the current effect key point, and update historical rendering effects of the historical effect key points in the current video frame.

On the basis of the above technical solution, the historical target effect surface obtaining unit includes:

an effect overlay weight value sub-unit configured to determine an effect overlay weight value corresponding to each historical target effect surface;

a to-be-overlaid rendering effect determining sub-unit configured to obtain, based on the effect overlay weight value and a corresponding target effect surface, to-be-overlaid rendering effects of a plurality of pixel points of each group of historical target effects; and a current to-be-processed rendering effect determining sub-unit configured to determine, based on the to-be-overlaid rendering effects and the target effect surface of the current video frame, the current to-be-processed rendering effect of the current effect key point, and update historical rendering effects of the historical effect key points in the current video frame.

On the basis of the above technical solution, the current to-be processed rendering effect determining sub-unit includes:

a to-be-processed rendering effect layer configured to determine, according to the target effect surface of the current video frame, historical rendering effects of the historical effect key points in the current video frame, and determine the current to-be-processed rendering effect of the at least one current effect key point; and a to-be processed rendering effect updating layer configured to overlay the to-be-overlaid rendering effects to corresponding pixel points in the current video frame, to update a plurality of the historical rendering effects and the current to-be-processed rendering effect.

On the basis of the above technical solution, the to-be-processed rendering effect update layer is further configured to:

if it is detected that rendering effect values corresponding to a plurality of pixel points are less than a preset rendering effect threshold, clear the rendering effect values of the plurality of pixel points, to obtain the target video frame corresponding to the current video frame.

On the basis of the above technical solution, the target video frame determining module is configured to:

add the at least one group of target effects to corresponding target limb key points, to obtain the target video frame corresponding to the current video frame.

The image processing apparatus according to the embodiment of the present disclosure can perform the image processing method according to any of embodiments of the present disclosure, which includes the respective functional modules for performing the method and have advantageous effects.

Units and modules of the apparatus are divided according to function logic. These units and modules may also be divided in other manners as long as the corresponding functions can be achieved. Moreover, names of these functional units are used for distinguishing between these functional units, without suggesting limitation to the scope of this embodiment of the present disclosure.

Figure 10:
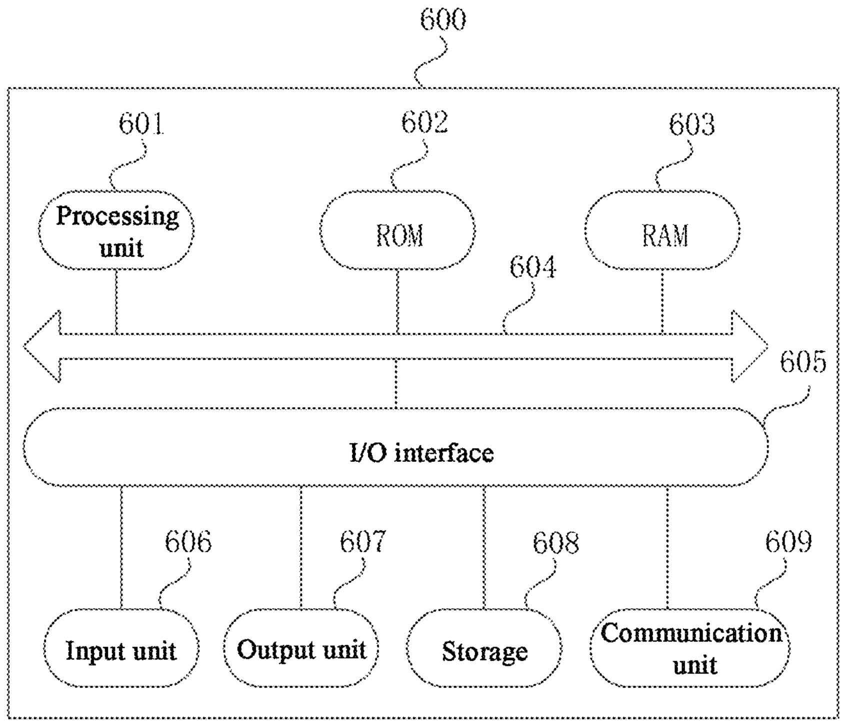
FIG. 10 illustrates a structural schematic diagram of an electronic device according to an embodiment of the present disclosure.

Reference below will be made to FIG. 10 which illustrates a structural schematic diagram of an electronic device (e.g. a terminal device or a server in FIG. 10) 600 adapted to implement embodiments of the present disclosure. The electronic device according to the embodiments of the present disclosure may include, but is not limited to, a mobile terminal such as a mobile phone, a laptop computer, a digital broadcast receiver, a Personal Digital Assistant (PDA), a Portable Android Device (PAD), a Portable Media Player (PMP), an on-vehicle terminal (e.g. an on-vehicle navigation terminal) or the like, or a fixed terminal such as a digital TV, a desktop computer or the like. The electronic device as shown in FIG. 10 is provided merely as an example, without suggesting any limitation to the functions and the application range of the embodiments of the present disclosure.

As shown therein, the electronic device 600 may include a processing unit (e.g. a central processor, a graphics processor or the like) 601, which can execute various acts and processing based on programs stored in a Read Only Memory (ROM) 602 or a program loaded from a storage 606 to a Random Access Memory (RAM) 603. RAM 603 stores therein various programs and data required for operations of the electronic device 600. The processing unit 601, the ROM 602 and the RAM 603 are connected to one another via a bus 604. An input/output (I/O) interface 605 is also connected to the bus 604.

Typically, the following units may be connected to the I/O interface 605: an input unit 606 including, for example, a touchscreen, a touch pad, a keyboard, a mouse, a camera, a microphone, an accelerometer, a gyroscope and the like; an output unit 607 including, for example, a Liquid Crystal Display (LCD), a loudspeaker, a vibrator and the like; a storage 606 including, for example, a tape, a hard drive and the like; and a communication unit 609. The communication unit 609 can allow wireless or wired communication of the electronic device 600 with other devices to exchange data. Although FIG. 10 shows the electronic device 600 including various units, it would be appreciated that not all of the units as shown are required to be implemented or provided. Alternatively, more or fewer units may be implemented or provided.

According to embodiments of the present disclosure, the processes described above with reference to the flowcharts may be implemented as computer software programs. For example, embodiments of the present disclosure include a computer program product comprising a computer program carried on a computer readable medium, the computer program containing program code for performing the methods as in the flowcharts. In those embodiments, the computer program may be downloaded and installed from a network via the communication unit 609, or may be installed from the storage 606, or may be installed from the ROM 602. The computer program, when executed by the processing unit 601, performs the above-described functions defined in the method according to the embodiments of the present disclosure.

An embodiment of the present disclosure provides a computer storage medium having a computer program stored thereon, where the program implements the image processing method according to the above embodiments when executed by a processor.

It should be noted that the computer readable medium according to the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Read Only Memory (ROM), a Random Access Memory (RAM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store, a program for use by or in connection with an instruction execution system, apparatus, or device. In contrast, in the present disclosure, a computer readable signal medium may include a propagated data signal with computer readable program code embodied therein, either in baseband or as part of a carrier wave. Such propagated data signal may take many forms, including, but not limited to, an electro-magnetic signal, an optical signal, or any suitable combination thereof. A computer readable signal medium may also be any computer readable medium that is not a computer readable storage medium and that can communicate, propagate, or transmit a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (e.g. ad hoc peer-to-peer network), and any known network or network to be developed.

The computer-readable medium may be the one included in the electronic device, or may be provided separately, rather than assembled in the electronic device.

The computer-readable medium carries one or more programs which, when executed by the electronic device, cause the electronic device to: obtain at least two Internet Protocol addresses; send a node assessment request including the at least two Internet Protocol addresses to a node assessment device, in which the node assessment device selects an Internet Protocol address from the at least two Internet Protocol addresses and returns the Internet Protocol address; and receive the Internet Protocol address returned by the node assessment device; wherein, the obtained Internet Protocol address indicates an edge node in a content distribution network.

Alternatively, the computer-readable medium carries one or more programs which, when executed by the electronic device, cause the electronic device to:

- determine at least one target limb key point of a current video frame;
- determine at least one current effect key point according to the at least one target limb key point and historical limb key points of at least one historical video frame adjacent to the current video frame;
- obtain historical effect key points of the at least one historical video frame according to preset effect parameters, and determining, according to the at least one current effect key point and the historical effect key points, at least one group of target effects matching the preset effect parameters; and
- determine the target video frame corresponding to the current video frame based on the at least one group of target effects.

Computer program codes for performing operations of the present disclosure may be written by using one or more program design language or any combination. The program design language includes, but is not limited to, object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowchart and block diagrams in the drawings illustrate the functionality and operation of possible implementations of methods, apparatus and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems which perform the specified functions or acts, or combinations of special purpose hardware and computer instructions.

The units described in the embodiments of the present disclosure may be implemented by software or hardware. Wherein, the designation of a module or unit does not in some cases constitute a limitation to the unit itself. For example, a first obtaining unit may also be described as "a unit for obtaining at least two Internet Protocol addresses".

The functions described above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chip (SOCs), Complex Programmable Logic Devices (CPLDs), and the like.

In the context of this disclosure, a machine-readable medium may be a tangible medium that can contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a computer-readable storage medium would include an electrical connection based on one or more wires, a portable computer diskette, a hard disk, a Read Only Memory (ROM), a Random Access Memory (RAM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, [Example I] provides an image processing method, including:

- determining at least one target limb key point of a current video frame;
- determining at least one current effect key point according to the at least one target limb key point and historical limb key points of at least one historical video frame adjacent to the current video frame; and
- obtaining historical effect key points of the at least one historical video frame according to preset effect parameters, and determining, according to the at least one current effect key point and the historical effect key points, at least one group of target effects matching the preset effect parameters.

According to one or more embodiments of the present disclosure, [Example II] provides an image processing method, further including:

determining the at least one target limb key point in the current video frame using a limb key point recognition algorithm; or processing the current video frame using a pre-trained limb key point recognition model, to obtain the at least one target limb key point corresponding to the current video frame.

According to one or more embodiments of the present disclosure, [Example III] provides an image processing method, further including:

determining a plurality of limb key points belonging to a same part as a group of limb key points, wherein the group of limb key points comprises the target limb key point and/or the historical limb key points;

for each group of limb key points of a plurality of groups of limb key points, determining a to-be-processed key point according to weight values and corresponding key point coordinates of historical limb key points in each group of limb key points; and determining a current effect key point corresponding to said each group of limb key points according to the to-be-processed key point corresponding to said each set of key points and a corresponding target key point.

According to one or more embodiments of the present disclosure, [Example IV] provides an image processing method, further including:

determining a weight value of each historical video frame according to a generation time of said each historical video frame, wherein the weight value is inversely proportional to the generation time;

obtaining an intermediate value by computing a product of key point coordinates of historical limb key points of said each historical video frame and the corresponding weight value, and obtaining the to-be-processed key point by accumulating at least one intermediate value.

According to one or more embodiments of the present disclosure, [Example V] provides an image processing method, further including:

obtaining, according to the effect strip display length, the historical effect key points of at least one historical frame preceding the current video frame.

According to one or more embodiments of the present disclosure, [Example VI] provides an image processing method, further including:

obtaining a plurality of groups of target effects matching the preset effect parameters by processing historical effect key points and the at least one current effect key point of a same part.

According to one or more embodiments of the present disclosure, [Example VII] provides an image processing method, further including:

determining, according to a target effect surface corresponding to the current video frame, a current to-be-processed rendering effect of the current effect key point, and updating historical rendering effects of the historical effect key points in the current video frame;

determining, according to historical rendering effects and the current to-be-processed rendering effect of a same part, a plurality of groups of target effects matching the preset effect parameters;

wherein a total length of a plurality of target fields in the target effect surface matches a length parameter of an effect strip in the preset effect parameters.

According to one or more embodiments of the present disclosure, [Example VIII] provides an image processing method, further including:

creating a to-be-processed surface corresponding to the target effect;

determining ordinate values corresponding to a plurality of abscissas in the to-be-processed surface, and determining, based on a plurality of ordinate values, a to-be-used surface; and determining rendering effects of a plurality of points in the to-be-used surface, to obtain the target effect surface.

According to one or more embodiments of the present disclosure, [Example IX] provides an image processing method, further including:

determining abscissas corresponding to the target effect surface based on a three-dimensional historical video frame to which the historical effect key points belong, and generation time information of the current video frame; and determining, according to the abscissas, a current to-be-processed rendering effect of the current video frame, and updating historical rendering effects of historical effect key points corresponding to at least one historical video frame.

According to one or more embodiments of the present disclosure, [Example X] provides an image processing method, further including:

obtaining historical target effect surfaces of a plurality of historical video frames preceding and adjacent to the current video frame; and determining, according to a plurality of the historical target effect surfaces and the target effect surface, the current to-be-processed rendering effect of the at least one current effect key point, and updating historical rendering effects of the historical effect key points in the current video frame.

According to one or more embodiments of the present disclosure, [Example XI] provides an image processing method, further including:

determining an effect overlay weight value corresponding to each historical target effect surface;

obtaining, according to the effect overlay weight value and a corresponding target effect surface, to-be-overlaid rendering effects of a plurality of pixel points of each group of historical target effects in at least one group of historical target effects; and determining, according to the to-be-overlaid rendering effects and the target effect surface of the current video frame, the current to-be-processed rendering effect of the at least one current effect key point, and updating historical rendering effects of the historical effect key points in the current video frame.

According to one or more embodiments of the present disclosure, [Example XII] provides an image processing method, further including:

determining, according to the target effect surface of the current video frame, the historical rendering effects of the historical effect key points in the current video frame, and determining the current to-be-processed rendering effect of the at least one current effect key point; and overlaying the to-be-overlaid rendering effects onto corresponding pixel points in the current video frame, to update a plurality of the historical rendering effects and the current to-be-processed rendering effect.

According to one or more embodiments of the present disclosure, [Example XIII] provides an image processing method, further including:

if it is detected that rendering effect values corresponding to a plurality of pixel points are less than a preset rendering effect threshold, clearing the rendering effect values of the plurality of pixel points, to obtain the target video frame corresponding to the current video frame.

According to one or more embodiments of the present disclosure, [Example XIV] provides an image processing method, further including:

adding the at least one group of target effects to a corresponding target limb key point, to obtain the target video frame corresponding to the current video frame.

According to one or more embodiments of the present disclosure, [Example XV] provides an image processing apparatus, including:

a target limb key point determining module configured to determine at least one target limb key point of a current video frame;

a current effect key point determining module configured to determine at least one current effect key point according to the at least one target limb key point and historical limb key points of at least one historical video frame adjacent to the current video frame;

a target effect group determining module configured to obtain historical effect key points of the at least one historical video frame according to preset effect parameters, and determine, according to the at least one current effect key point and the historical effect key points, at least one group of target effects matching the preset effect parameters; and a target video frame determining module configured to determine a target video frame corresponding to the current video frame based on the at least one group of target effects.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate embodiments may also be implemented in combination in a single embodiment. Conversely, various features that are described in the context of a single implementation may also be implemented in multiple embodiments separately or in any suitable subcombination.

We claim:

1. An image processing method, comprising:

determining at least one target limb key point of a current video frame;

determining at least one current effect key point according to the at least one target limb key point and historical limb key points of at least one historical video frame adjacent to the current video frame;

obtaining historical effect key points of the at least one historical video frame according to preset effect parameters, and determining, according to the at least one current effect key point and the historical effect key points, at least one group of target effects matching the preset effect parameters; and determining a target video frame corresponding to the current video frame based on the at least one group of target effects, wherein determining the at least one current effect key point according to the at least one target limb key point and the historical limb key points of at least one historical video frame adjacent to the current video frame comprises:

determining a plurality of limb key points belonging to a same part as a group of limb key points, wherein the group of limb key points comprises at least one of the target limb key point and the historical limb key points, for each group of limb key points of a plurality of groups of limb key points, determining a to-be-processed key point according to weight values and corresponding key point coordinates of historical limb key points in each group of limb key points, and determining at least one current effect key point corresponding to each group of limb key points according to the to-be-processed key point corresponding to each set of key points and a corresponding target key point.

2. The method of claim 1, wherein determining the at least one target limb key point of the current video frame comprises:

determining the at least one target limb key point in the current video frame using a limb key point recognition algorithm; or processing the current video frame using a pre-trained limb key point recognition model, to obtain the at least one target limb key point corresponding to the current video frame.

3. The method of claim 1, wherein determining the to-be-processed key point according to the weight values and the corresponding key point coordinates of the historical limb key points in each group of limb key points comprises:

determining a weight value of each historical video frame according to a generation time of each historical video frame, wherein the weight value is inversely proportional to the generation time; and obtaining an intermediate value by computing a product of key point coordinates of historical limb key points of each historical video frame and the corresponding weight value, and obtaining the to-be-processed key point by accumulating at least one intermediate value.

4. The method of claim 1, wherein the preset effect parameters comprise an effect strip display length, and obtaining the historical effect key points of the at least one historical video frame according to the preset effect parameters comprises:

obtaining, according to the effect strip display length, the historical effect key points of at least one historical frame preceding the current video frame.

5. The method of claim 1, wherein determining, according to the at least one current effect key point and the historical effect key points, the at least one group of target effects matching the preset effect parameters comprises:

obtaining a plurality of groups of target effects matching the preset effect parameters by processing historical effect key points and the at least one current effect key point of a same part.

6. The method of claim 1, wherein determining, according to the at least one current effect key point and the historical effect key points, the at least one group of target effects matching the preset effect parameters comprises:

determining, according to a target effect surface corresponding to the current video frame, a current to-be-processed rendering effect of the at least one current effect key point, and updating historical rendering effects of the historical effect key points in the current video frame; and determining, according to historical rendering effects and the current to-be-processed rendering effect of a same part, a plurality of groups of target effects matching the preset effect parameters;

wherein a total length of a plurality of target fields in the target effect surface matches a length parameter of an effect strip in the preset effect parameters.

7. The method of claim 6, further comprising:

creating a to-be-processed surface corresponding to the target effect;

determining ordinate values corresponding to a plurality of abscissas in the to-be-processed surface, and determining, based on a plurality of ordinate values, a to-be-used surface; and determining rendering effects of a plurality of points in the to-be-used surface, to obtain the target effect surface.

8. The method of claim 6, wherein determining, according to the target effect surface corresponding to the current video frame, the current to-be-processed rendering effect of the at least one current effect key point, and updating the historical rendering effects of the historical effect key points in the current video frame, comprise:

determining abscissas corresponding to the target effect surface according to at least one historical video frame to which the historical effect key points belong, and generation time information of the current video frame; and determining, according to the abscissas, a current to-be-processed rendering effect of the current video frame, and updating historical rendering effects of historical effect key points corresponding to at least one historical video frame.

9. The method of claim 6, wherein determining, according to the target effect surface corresponding to the current video frame, the current to-be-processed rendering effect of the at least one current effect key point, and updating the historical rendering effects of the historical effect key points in the current video frame, comprise:

obtaining historical target effect surfaces of a plurality of historical video frames preceding and adjacent to the current video frame; and determining, according to a plurality of the historical target effect surfaces and the target effect surface, the current to-be-processed rendering effect of the at least one current effect key point, and updating historical rendering effects of the historical effect key points in the current video frame.

10. The method of claim 9, wherein determining, according to the plurality of the historical target effect surfaces and the target effect surface, the current to-be-processed rendering effect of the at least one current effect key point, and updating the historical rendering effects of the historical effect key points in the current video frame, comprise:

determining an effect overlay weight value corresponding to each historical target effect surface;

obtaining, according to each effect overlay weight value and a corresponding target effect surface, to-be-overlaid rendering effects of a plurality of pixel points of each group of historical target effects in at least one group of historical target effects; and determining, according to the to-be-overlaid rendering effects and the target effect surface of the current video frame, the current to-be-processed rendering effect of the at least one current effect key point, and updating historical rendering effects of the historical effect key points in the current video frame.

11. The method of claim 10, wherein determining, according to the to-be-overlaid rendering effects and the target effect surface of the current video frame, the current to-be-processed rendering effect of the at least one current effect key point, and updating the historical rendering effects of the historical effect key points in the current video frame, comprise:

determining, according to the target effect surface of the current video frame, the historical rendering effects of the historical effect key points in the current video frame, and determining the current to-be-processed rendering effect of the at least one current effect key point; and overlaying the to-be-overlaid rendering effects onto corresponding pixel points in the current video frame, to update a plurality of the historical rendering effects and the current to-be-processed rendering effect.

12. The method of claim 11, further comprising:

in response to detecting that rendering effect values corresponding to a plurality of pixel points are less than a preset rendering effect threshold, clearing the rendering effect values of the plurality of pixel points, to obtain the target video frame corresponding to the current video frame.

13. The method of claim 1, wherein determining the target video frame corresponding to the current video frame based on the at least one group of target effects comprises:

adding the at least one group of target effects to a corresponding target limb key point, to obtain the target video frame corresponding to the current video frame.

14. An electronic device, comprising:

one or more processors; and a storage configured to store one or more computer programs, wherein the one or more computer programs, when executed by the one or more processors, cause the one or more processors to implement operations comprising:

determining at least one target limb key point of a current video frame;

determining at least one current effect key point according to the at least one target limb key point and historical limb key points of at least one historical video frame adjacent to the current video frame;

obtaining historical effect key points of the at least one historical video frame according to preset effect parameters, and determining, according to the at least one current effect key point and the historical effect key points, at least one group of target effects matching the preset effect parameters; and determining a target video frame corresponding to the current video frame based on the at least one group of target effects, wherein determining the at least one current effect key point according to the at least one target limb key point and the historical limb key points of at least one historical video frame adjacent to the current video frame comprises:

determining a plurality of limb key points belonging to a same part as a group of limb key points, wherein the group of limb key points comprises at least one of the target limb key point and the historical limb key points, for each group of limb key points of a plurality of groups of limb key points, determining a to-be-processed key point according to weight values and corresponding key point coordinates of historical limb key points in each group of limb key points, and determining at least one current effect key point corresponding to each group of limb key points according to the to-be-processed key point corresponding to each set of key points and a corresponding target key point.

15. The electronic device of claim 14, wherein determining the at least one target limb key point of the current video frame comprises:

determining the at least one target limb key point in the current video frame using a limb key point recognition algorithm; or processing the current video frame using a pre-trained limb key point recognition model, to obtain the at least one target limb key point corresponding to the current video frame.

16. The electronic device of claim 14, wherein determining the to-be-processed key point according to the weight values and the corresponding key point coordinates of the historical limb key points in each group of limb key points comprises:

determining a weight value of each historical video frame according to a generation time of each historical video frame, wherein the weight value is inversely proportional to the generation time; and obtaining an intermediate value by computing a product of key point coordinates of historical limb key points of each historical video frame and the corresponding weight value, and obtaining the to-be-processed key point by accumulating at least one intermediate value.

17. The electronic device of claim 14, wherein the preset effect parameters comprise an effect strip display length, and obtaining the historical effect key points of the at least one historical video frame according to the preset effect parameters comprises:

obtaining, according to the effect strip display length, the historical effect key points of at least one historical frame preceding the current video frame.

18. A non-transitory storage medium having computer executable instructions which, when executed by a computer processor, are configured to execute operations comprising:

determining at least one target limb key point of a current video frame;

determining at least one current effect key point according to the at least one target limb key point and historical limb key points of at least one historical video frame adjacent to the current video frame;

obtaining historical effect key points of the at least one historical video frame according to preset effect parameters, and determining, according to the at least one current effect key point and the historical effect key points, at least one group of target effects matching the preset effect parameters; and determining a target video frame corresponding to the current video frame based on the at least one group of target effects, wherein determining the at least one current effect key point according to the at least one target limb key point and the historical limb key points of at least one historical video frame adjacent to the current video frame comprises:

determining a plurality of limb key points belonging to a same part as a group of limb key points, wherein the group of limb key points comprises at least one of the target limb key point and the historical limb key points, for each group of limb key points of a plurality of groups of limb key points, determining a to-be-processed key point according to weight values and corresponding key point coordinates of historical limb key points in each group of limb key points, and determining at least one current effect key point corresponding to each group of limb key points according to the to-be-processed key point corresponding to each set of key points and a corresponding target key point.

19. The non-transitory storage medium of claim 18, wherein determining the to-be-processed key point according to the weight values and the corresponding key point coordinates of the historical limb key points in each group of limb key points comprises:

determining a weight value of each historical video frame according to a generation time of each historical video frame, wherein the weight value is inversely proportional to the generation time; and obtaining an intermediate value by computing a product of key point coordinates of historical limb key points of each historical video frame and the corresponding weight value, and obtaining the to-be-processed key point by accumulating at least one intermediate value.

20. The non-transitory storage medium of claim 18, wherein the preset effect parameters comprise an effect strip display length, and obtaining the historical effect key points of the at least one historical video frame according to the preset effect parameters comprises:

obtaining, according to the effect strip display length, the historical effect key points of at least one historical frame preceding the current video frame.

* * * * *